Sept. 25, 1956  A. B. LEONARD ET AL  2,764,623
METHOD OF OPERATING A CATALYTIC ACID ALKYLATION UNIT
Filed Nov. 21, 1951
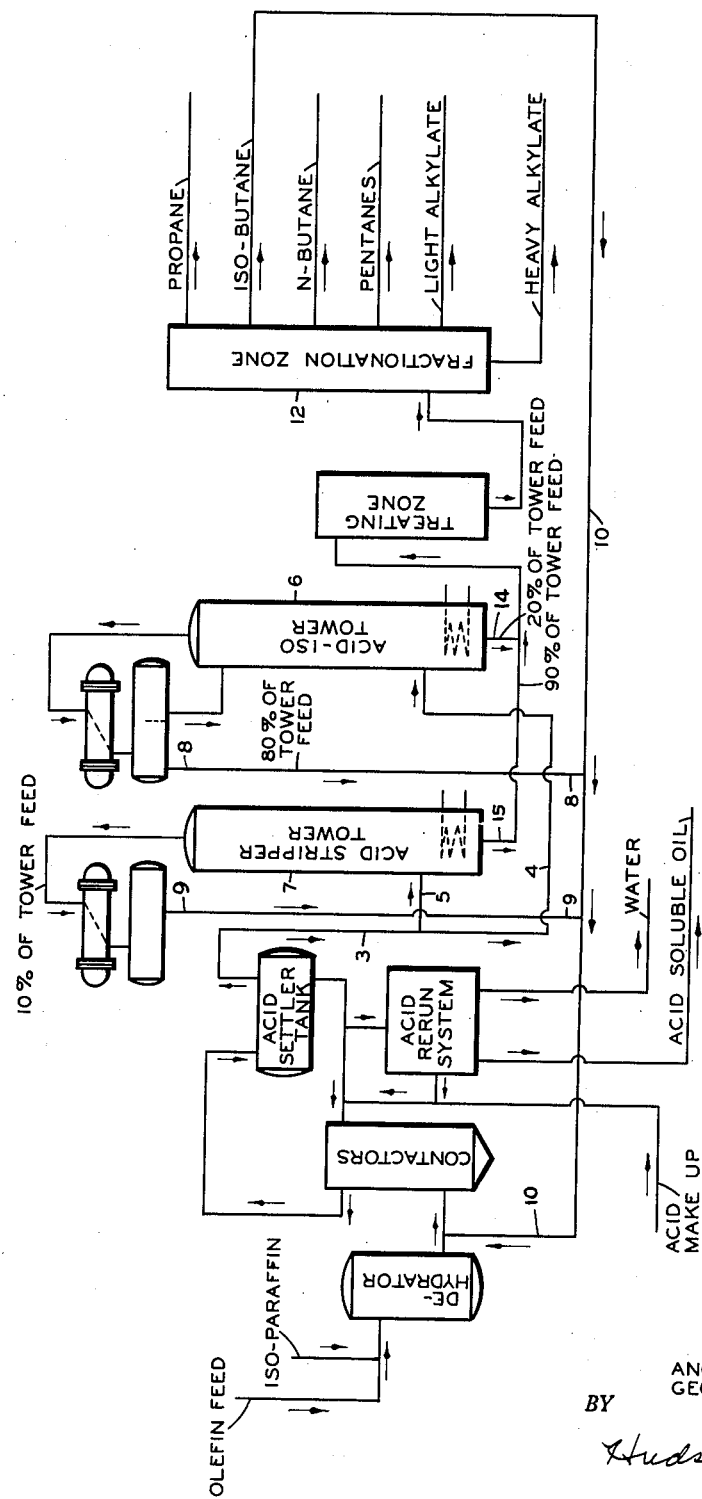
INVENTORS
ANCEL B. LEONARD
GEORGE R. HETTICK
BY
Hudson and Young
ATTORNEYS

United States Patent Office 2,764,623
Patented Sept. 25, 1956

2,764,623

METHOD OF OPERATING A CATALYTIC ACID ALKYLATION UNIT

Ancel B. Leonard and George Riley Hettick, Phillips, Tex., assignors to Phillips Petroleum Company, a corporation of Delaware Application November 21, 1951, Serial No. 257,522

11 Claims. (Cl. 260—683.4)

This invention relates to the alkylation of a hydrocarbon. In one aspect it relates to the alkylation of an isoparaffin with an olefin employing hydrofluoric acid (HF) as a catalyst. In another aspect the invention relates to a combination of related and cooperative steps with which the quality, and to some extent, the quantity of the so-called "light alkylate" further discussed herein can be increased or, if desired, the quality of said light alkylate can be maintained constant and a substantial increase in the quantity thereof effected. The invention is particularly valuable in the present emergency for increasing the capacity of existing alkylation units which are bottlenecked by fractionation capacity. The present shortage of steel for construction of new plants makes the increased production of alkylate from existing plants important. Increasing the quality or quantity of alkylate obtainable from existing equipment not only results in more aviation gasoline but also conserves material and labor needed in other phases of the defense effort, which would now be diverted to the construction of additional alkylation capacity.

In the operation of catalytic acid alkylation units, such as HF units, for the alkylation of branched-chain, paraffinic hydrocarbons with olefin hydrocarbons, it is known that the resulting yield and the octane number of the alkylate product depend primarily upon the ratio or relative amounts of isoparaffin and olefin in the mixture to be alkylated. An increase in octane number will permit considerably more of a low octane blending stock to be used in the finished aviation fuel and an increased yield of alkylate will further increase the amount of finished gasoline that can be blended. Along with an increase in octane number and yield, the higher the isoparaffin-to-olefin ratio the more nearly will the reaction be to the theoretical, resulting in a smaller production of less desirable light components such as pentanes and hexanes. Such light components increase the vapor pressure of the butane-free alkylate and decrease the amount of light materials which can be used in blending. The reduction in the amount of light components produced is accompanied by a lower production of heavy fractions whose boiling range is above that desired in the average gasoline. Is the isoparaffin-to-olefin ratio is raised sufficiently high, practically no heavy material is formed with the desirable alkylate and the formation of acid-soluble oils is reduced, resulting in considerably less acid required to be re-run in the acid re-run facilities. However, in many existing units the isoparaffin-to-olefin ratio cannot be increased without serious reduction in yield due to lack of fractionating capacity.

The function of the acid stripper tower in a conventional alkylation unit is to remove a small amount of suspended and dissolved acid catalyst from the reacted hydrocarbon mixture by a distillation or fractionation process. Operating conditions on the acid stripper tower are regulated to take overhead therefrom a minimum of hydrocarbons along with the acid catalyst. In some units the hydrocarbon mixture taken overhead, after separation from the acid, is returned as a recycle to the acid stripper tower and eventually passes out the bottom thereof with the acid-free reacted hydrocarbon mixture. In other units this overhead stream is mixed with the fresh unreacted stream and the combined stream charged to the reactors. This overhead stream is rich in isoparaffin. Therefore when the latter method is used some benefit is gained due to the increased isoparaffin-to-olefin ratio in the reactors as discussed above. However, since the overhead stream contains appreciable quantities of the lighter inert hydrocarbons such as propane, the amount of overhead stream which can be recycled in this manner is limited, otherwise these lighter inert hydrocarbons will build up to excessive concentrations in the system.

We have now found by employment of a second tower or zone immediately following and acting upon the hydrocarbon phase from the acid settler tank or zone that we can increase the yield and/or quality of alkylate obtainable from an existing alkylation unit and that this is possible without in any other manner altering the existing apparatus or unit. Thus, we have found by dividing the hydrocarbon effluent obtained from the acid settler, in a manner detailed hereinafter, and passing the portions of effluent thus obtained into at least two towers or zones that we can return to the alkylation zone or contactor an increased quantity of isoparaffin and to this extent, with a fixed isoparaffin feed to the unit, the load upon the final fractionation zone in respect of the separation and consequent return of isobutane has been decreased, signifying that now additional isoparaffin can be fed into the said unit, if desired. Further, by operating said zones, following the acid settler as hereinafter detailed, we have found that it is possible to prevent a build-up, to excessive concentrations, of propane in the system. Thus, by dividing the acid settler effluent into two portions, one of which is passed to the first of a plurality of fractionation zones or towers, and another of which is passed to another of said zones or towers, the first zone being operated to take off overhead, no more than about 10 percent of the feed thereto, and the other being operated to take off overhead about 80 percent of the feed, excessive build-up of propane in the system can be avoided and that an increase in yield and/or quality of light alkylate can be obtained from an existing alkylation unit.

According to this invention there is provided a method of operation of an alkylation unit, in which a conventional contactor zone and a conventional settler zone are employed, which comprises: providing a combined acid stripper-deisobutanizer tower (acid-iso tower) or zone to be operated in parallel with an existing acid stripper tower or zone, to which is ordinarily fed from said settler a hydrocarbon phase effluent comprising isoparaffin, normal paraffin and a lighter hydrocarbon; feeding a portion of said effluent to said acid-iso tower; feeding a portion of said effluent to said acid stripper tower; operating said towers to remove as bottoms from said acid-iso tower a stream of hydrocarbons rich in normal paraffin and from said acid stripper tower a stream rich in said lighter hydrocarbon; and as overhead from said towers, a stream rich in isoparaffin from said acid-iso tower and a stream rich in isoparaffin from said acid stripper tower and feeding said overhead streams thus obtained to said contactor thereby to increase the ratio of isoparaffin-to-olefin therein and to enable an increase in the yield as well as quality of the alkylate produced.

The invention will now be more fully described by reference to the attached diagrammatic drawing. In a conventional alkylation unit a hydrocarbon stream comprising olefins such as a butane-butene mixture commonly available from refinery cracking operations is charged together with an isoparaffin stream such as isobutane to a dehydrator as shown. The hydrocarbon stream is then contacted with hydrofluoric acid in approximately 1:1 ratio at a temperature generally between 80° F. and 120° F. The effluent from the contactors is passed to an acid settling tank wherein a separation between hydrocarbons and acid is effected. The acid phase is recycled to the contactors. A small portion of the recycled acid stream can be passed through the acid rerun system. The hydrocarbon phase is withdrawn through line 3 and charged through line 5 to acid stripper tower 7. A stream comprising isobutane and lighter hydrocarbons together with a small amount of free HF originally entrained in the feed to said tower is removed overhead, condensed, and returned through lines 9 and 10 to the contactors. The bottom stream withdrawn from tower 7 is passed through a treating zone to fractionation facilities 12 for the separation of desired alyklate and unreacted hydrocarbons. The unreacted isobutane is recycled through line 10 to the contactors.

When operating according to one embodiment of our invention, approximately one-third of the hydrocarbon phase in line 3 is charged through line 4 to acid-iso tower 6 operating in parallel with acid stripper tower 7. The stream taken overhead, comprising isobutane and lighter hydrocarbon together with a small amount of free HF originally entrained in the feed to the tower, is condensed and returned through lines 8 and 10 to the contactors. This overhead stream comprises approximately 80 per cent of the feed to the acid-iso tower 6. The remaining two thirds of the hydrocarbon phase in line 3 is charged to acid stripper tower 7 thus providing for parallel operation of tower 7 with said tower 6. A stream comprising isobutane and lighter hydrocarbons together with a small amount of free HF originally entrained in the feed to the tower, is condensed and returned through lines 9 and 10 to the contactors. This overhead stream comprises approximately 10 per cent of the feed to the acid stripper tower 7. The bottom stream withdrawn from acid-iso tower 6 through line 14 is combined with that withdrawn from acid stripper tower 7 through line 15 and processed as described.

It should be noted that whereas the composition of the feed to the acid stripper tower and the acid-iso tower is the same, the quantity charged to the acid stripper tower is approximately twice that charged to the new acid-iso tower. The overhead stream from the acid-iso tower is about 80 percent of the tower feed while the overhead stream from the existing acid stripper tower is only about 10 percent of the tower feed. These differences in the quantities charged to the towers, and the quantities taken overhead from each, prevent an excessive build-up of light hydrocarbons, such as propane, in the system. It is the use of the towers, operated as described, which constitutes our invention, the advantages of which pertinently noted here are, among others, that of the said operation prevents the build-up, to excessive concentrations, of propane and lighter hydrocarbons in the system, thus avoiding, (a) undesired build-up of the unit pressure, (b) the recycling of inert propane and lighter hydrocarbons which contribute nothing appreciable to the operation, and (c) the cost thereby involved as well as, importantly, a lowering of the overall capacity of the said unit, which, indeed, still according to the invention has been increased as described herein.

We have found when operating according to our invention that a desirable ratio of the volume of the feed to the acid stripper tower to the volume of the feed to the acid-iso tower is from 1:3 to 5:1 with approximately a 2:1 to 3:1 ratio being preferred for most operations because in most instances the charge to the alkylation unit contains hydrocarbons lighter than those being alkylated. Thus when charging to the alkylation unit an olefin containing stream which contains only a small amount of hydrocarbons lighter than those being reacted, for example propane in a stream comprising butanes and butenes, the ratio of the volume of feed to the acid stripper tower to the volume of the feed to the acid-iso tower will generally be in the range of 1:1 to 1:3. When the said stream contains substantial quantities of said lighter hydrocarbons the said ratio will generally be in the range of 1:1 to 5:1. When using a ranging ratio from 2:1 to 3:1 on tower feeds containing substantial amounts of said lighter hydrocarbons we have found it desirable to take from 5 to 20 percent of the feed to the acid stripper overhead therefrom and to take from 70 to 90 percent of the feed to the acid-iso tower overhead therefrom.

The following examples, based upon experience and data obtained actually operating the invention, serve to illustrate the same. Example I shows conventional operation of a HF alkylation unit. Example II illustrates the use of our invention to effect a substantial increase in the quality of the desired light alkylate.

*Example I*

160 B./H. of olefin stream comprising a mixture of butanes and butenes commonly available from refinery cracking operations and 192 B./H. of fresh isobutane were charged to a conventional HF alkylation unit equipped with only one acid stripper tower such as tower 7. 480 B./H. of isobutane were recycled to give an isobutane-to-olefin ratio of 4.6. The propane content of the system, i. e., in the hydrocarbon phase from the acid settler tank, was 12 percent. The yield of desired light alkylate was 238 B./H. or 96.9 per cent of total alkylate, while the yield of heavy alkylate was 7.5 B./H. or 3.1 per cent of total alkylate. Operating conditions were those commonly employed, i. e., 1:1 acid to hydrocarbon ratio, 92° F. contacting temperature, HF acidity 89 per cent etc. The quality of the desired light alkylate fraction as measured by octane ratings was 107.5 lean mixture rating and 1.90 rich mixture rating.

*Example II*

In the same HF alkylation unit referred to in Example I, after the addition of the acid-iso stripper tower 6, 160 B./H. of olefin stream, of substantially the same composition as that used in Example I, were charged together with 192 B./H. of fresh isobutane. 480 B./H. of isobutane from fractionation system 12 together with 215 B./H. of isobutane in the overhead streams from towers 6 and 7 were recycled to give an isobutane-to-olefin ratio of 5.54. 400 B./H. were charged to acid-iso tower 6 and 300 B./H. or 75 per cent taken overhead therefrom. 1200 B./H. were charged to acid stripper tower 7 and 120 B./H. or 10 per cent taken overhead therefrom. The propane content of the system was 17 per cent. The yield of desired light alkylate was 249 B./H. or 98.8 per cent of the total alkylate. The yield of heavy alkylate was 3.1 B./H. or 1.2 per cent of the total alkylate. Operating conditions were substantially the same as those given in Example I. The quality of the desired light alkylate as measured by octane ratings was 108.2 lean mixture rating and 2.06 rich mixture rating. Furthermore, the Reid vapor pressure of the desired light alkylate fraction was 3.4 pounds compared to 3.6 pounds for that of Example I.

The advantages of higher quality and lower vapor pressure alkylate in blending operations will be readily understood by those skilled in the art.

If desired, advantage can be taken of the increased isobutane-to-olefin ratio to increase the yield of alkylate of a given quality. For instance, in Example II if excess olefin stream is available one could increase the amount of the olefin stream charged so as to hold the isobutane to olefin ratio comparable to that given in Example I and thereby increase the yield of alkylate of the quality produced in Example I.

Or, if desired, olefins other than butenes, can be included, for example propylenes and amylenes if these are available, and in that manner increase the yield of alkylate of a given quality. It is now known that for a given isobutane to olefin ratio the inclusion of propylenes and amylenes along with butenes in the feed to an alkylation unit results in a lower quality alkylate from an octane rating standpoint. Our invention makes it possible to utilize propylenes and amylenes in an existing alkylation unit to give a substantial increase in yield without causing an appreciable decrease in alkylate quality. This is illustrated in Example III.

*Example III*

In the alkylation unit described in Example II 18 B./H. of amylenes was included with 160 B./H. of the feed stream comprising butane-butenes and charged with 214 B./H. of fresh isobutane. 480 B./H. of isobutane from fractionation system 12 together with 215 B./H. of isobutane in the overhead streams from towers 6 and 7 were recycled to give an isobutane-to-olefin ratio of 5.1. 400 B./H. were charged to acid-iso tower 6 and 300 B./H. or 75 per cent taken overhead therefrom. 1200 B./H. were charged to acid stripper tower 7 and 120 B./H. or 10 per cent taken overhead therefrom. The yield of desired light alkylate was 274 B./H. or 97.2 per cent of the total alkylate and the yield of heavy alkylate was 7.0 B./H. or 2.8 per cent of the total alkylate. Other operating conditions were substantially the same as those given in Example I. The quality of the desired light alkylate as measured by octane ratings was 108.0 lean mixture rating and 1.82 rich mixture rating.

From these examples, summarized in Table I, it is evident that by the use of our invention substantial increases in the yield or quality as desired, of the light alkylate from an existing alkylation unit can be effected.

TABLE I

| | Example I | Example II | Example III |
|---|---|---|---|
| Fresh Charge Streams to Contactors: | | | |
| Butanes-Butenes, B./H.[1] | 128 | 128 | 128 |
| Propylenes and Amylenes, B./H.[1] | 32 | 32 | 50 |
| Isobutane, B./H.[1] | 192 | 192 | 214 |
| Recycle Isobutane to Contactors: | | | |
| From Fractionation Zone 12, B./H.[1] | 480 | 480 | 480 |
| From Acid Stripper Tower 7, B./H.[1] | 65 | 65 | 65 |
| From Acid-Iso Tower 6, B./H.[1] | | 150 | 150 |
| Isobutane-to-Olefin Ratio | 4.61 | 5.54 | 5.1 |
| Yields: | | | |
| Light Alkylate, Percent of Total | 96.9 | 98.8 | 97.2 |
| Heavy Alkylate, Percent of Total | 3.1 | 1.2 | 2.8 |
| Quality of Light Alkylate: | | | |
| Lean Mixture Rating | 107.5 | 108.2 | 108.0 |
| Rich Mixture Rating | 1.90 | 2.06 | 1.82 |
| Reid Vapor Pressure | 3.6 | 3.4 | 3.4 |
| Tower Operating Conditions: | | | |
| Acid Stripper Tower 7— | | | |
| Feed, B./H. | 1,200 | 1,200 | 1,200 |
| Overhead, B./H. | 120 | 120 | 120 |
| Pressure, p. s. i. g. | 190 | 190 | 190 |
| Feed Temperature, °F | 140 | 138 | 138 |
| Top Temperature, °F | 151 | 145 | 145 |
| Bottom Temperature, °F | 195 | 190 | 190 |
| Acid-Iso Tower 6— | | | |
| Feed, B./H. | | 400 | 400 |
| Overhead B./H. | | 300 | 300 |
| Pressure, p. s. i. g. | | 210 | 210 |
| Feed Temperature, °F | | 92 | 92 |
| Top Temperature, °F | | 154 | 154 |
| Bottom Temperature, °F | | 230 | 230 |

[1] B./H.=barrels per hour.

It should be understood that while the invention has been described in the above examples as particularly related to the alkylation of isobutane with olefins in the presence of hydrofluoric acid it is not so limited. The invention is equally applicable to any alkylation process employing a volatile acid catalyst wherein a stripping operation such as described herein is carried out. For example, in the alkylation of benzene with high boiling olefins, benzene would be taken overhead from towers 6 and 7, in the manner described for isobutane, and recycled to the contactors to maintain a high aromatic to olefin ratio therein.

Likewise it should be understood that the ratio of the volume of the feed to the acid stripper tower to the volume of the feed to the acid-iso tower will depend upon the type of charge to the alkylation unit, the purity of the charge and the amount of light hydrocarbons which a particular unit can tolerate. For example, when charging a hydrocarbon stream consisting essentially of butanes and butenes to an alkylation unit of the type described above, the volume of the feed to the acid stripper tower can be less than the volume of the feed to the acid-iso tower due to the absence of appreciable quantities of propane and lighter hydrocarbons. Therefore, while the invention has been described as applied to a unit charging a hydrocarcon stream containing a considerable amount of hydrocarbons lighter than butanes and butenes it is not so limited.

Variation and modification are possible within the scope of the foregoing disclosure, drawing and appended claims to the invention, the essence of which is the method of operation comprising, operating a combined acid-iso tower in parallel with an existing acid stripper tower, taking overhead from the acid-iso tower a major portion of the feed thereto, taking overhead from the acid stripper tower a minor portion of the feed thereto, combining the two overhead streams and recycling the combined stream to the contactors to increase the amount of isoparaffin therein. In this manner the flexibility of an existing alkylation unit is greatly increased with minimum expenditure of material and money to give increased yield and/or quality of the alkylate produced therefrom.

We claim:

1. In a process for the alkylation of hydrocarbons in a reaction zone in the presence of an acid which is volatile under conditions employed in separating unreacted hydrocarbons from reacted hydrocarbons, the improved method of operation which comprises passing a portion of hydrocarbon phase effluent from said reaction zone to an acid stripper tower as feed thereto, passing another portion of said effluent as feed to an acid-iso tower operated in parallel with said acid stripper tower, the ratio of the volume of feed to said acid stripper tower to the volume of feed to said acid-iso tower being from 1:3 to 5:1, taking overhead from said acid-iso tower from 70 to 90 percent of the feed thereto, taking overhead from said acid stripper tower from 5 to 20 percent of the feed thereto, combining said overhead streams and passing said combined stream to said reaction zone.

2. A process for reacting olefins with isoparaffins in the presence of hydrofluoric acid which comprises contacting said olefins and said isoparaffin in a reaction zone under alkylating conditions, separating the effluent from said reaction zone into a hydrocarbon phase containing a small amount of hydrofluoric acid therein and an acid phase, returning said acid phase to said reaction zone, passing a portion of said hydrocarbon phase to an acid stripper tower, removing overhead from said acid stripper tower from 5 to 20 per cent of said hydrocarbon phase passed thereto, said overhead being a low boiling fraction comprising isoparaffin and lower boiling hydrocarbons and essentially all the hydrogen fluoride in said hydrocarbon phase, passing another portion of said hydrocarbon phase to an acid-iso tower, removing overhead from said acid-iso tower from 70 to 90 per cent of said hydrocarbon phase passed thereto, said overhead being a low boiling fraction comprising isoparaffin and lower boiling hydrocarbons and essentially all the hydrogen fluoride in said hydrocarbon phase, the ratio of the volume of said hydrocarbon phase passed to said acid stripper tower to the volume of said hydrocarbon phase passed to said acid-iso tower being from 1:3 to 5:1, combining the bottoms product stream from the said acid stripper tower with the bottoms product stream from said acid-iso tower, passing said combined bottoms product stream to a treating zone, passing the effluent from said treating zone to a fractionation zone, separating said effluent into streams of reacted and unreacted hydrocarbons, recycling the unreacted isoparaffin to said reaction zone to increase the concentration of isoparaffin therein, combining the said overhead stream from said acid stripper tower with the said overhead stream from said acid-iso tower and passing the combined stream to said reaction zone to further increase the concentration of isoparaffin therein.

3. A process for the alkylation of isoparaffin with an olefin in a reaction zone in the presence of an acid which is volatile under conditions employed in separating unreacted hydrocarbons from reacted hydrocarbons, to form a hydrocarbon phase effluent which contains propane, other normal paraffin, isoparaffin and dissolved acid and wherein a combined acid stripper-deisobutanizer zone (acid-iso zone) is provided to be operated in parallel with an acid stripper zone, the method of operation comprising: feeding a portion of said hydrocarbon phase effluent to said acid-iso zone, feeding another portion of said hydrocarbon phase effluent to said acid stripper zone, the ratio of the volume of said hydrocarbon phase passed to said acid stripper zone to the volume of said hydrocarbon phase passed to said acid-iso zone being from 1:3 to 5:1 removing as bottoms product from said acid-iso zone a stream of hydrocarbons rich in said other normal paraffin, removing as bottoms product from said acid stripper zone a stream rich in propane relative to said bottoms product from said acid-iso zone, thereby preventing excessive buildup of propane in said reaction zone, taking from 70 to 90 per cent of said feed overhead from said acid-iso zone as a stream comprising isoparaffin, taking from 5 to 20 per cent of said feed overhead from said acid stripper zone as a stream comprising isoparaffin, combining said overhead streams and passing said combined overhead stream to said reaction zone to increase the ratio of isoparaffin to olefin therein.

4. The process of claim 3 wherein said isoparaffin is isobutane and said olefin is contained in a mixture of $C_3$–$C_5$ hydrocarbons comprising olefins and normal paraffins having from 3 to 5 carbon atoms per molecule.

5. In a process for the alkylation of an isoparaffin with an olefin in a reaction zone in the presence of an acid which is volatile under conditions employed in separating unreacted hydrocarbons from reacted hydrocarbons, said unreacted hydrocarbons comprising isoparaffin, low-boiling non-reactive hydrocarbon, and other non-reactive hydrocarbons, the improved method of operation which comprises: passing a portion of hydrocarbon phase effluent from said reaction zone to an acid-iso fractionation zone, said effluent comprising reacted hydrocarbons, unreacted hydrocarbons and dissolved acid; passing another portion of said effluent to an acid stripper fractionation zone operated in parallel with said acid-iso fractionation zone, the ratio of the volume of said hydrocarbon phase passed to said acid stripper zone to the volume of said hydrocarbon phase passed to said acid-iso zone being from 1:3 to 5:1; removing as bottoms product from said acid-iso fractionation zone a stream rich in said other non-reactive hydrocarbon; removing as bottoms product from said acid-stripper fractionation zone a stream rich in said low-boiling non-reactive hydrocarbon relative to said bottoms product from said acid-iso fractionation zone, thereby preventing excessive buildiup of said low-boiling non-reactive hydrocarbon in said reaction zone; taking overhead from said acid-iso fractionation zone a low-boiling fraction comprising unreacted hydrocarbons and acid, said low-boiling fraction being from 70 to 90 per cent of said effluent passed to said acid-iso fractionation zone; taking overhead from said acid-stripper fractionation zone a low-boiling fraction comprising unreacted hydrocarbons and acid, said last-mentioned low-boiling fraction being from 5 to 20 per cent of said effluent passed to said acid-stripper fractionation zone; combining said overhead fractions and passing said combined stream to said reaction zone to increase the isoparaffin to olefin ratio therein.

6. A process for alkylating an alkylatable hydrocarbon with an alkylating agent in a reaction zone under alkylating conditions in the presence of an acid which is volatile under conditions employed in separating unreacted hydrocarbons from reacted hydrocarbons to form a hydrocarbon phase effluent from said reaction zone which contains low-boiling inert hydrocarbon, other inert hydrocarbon, alkylating agent, alkylate and dissolved acid, the method of operation which comprises: providing a second fractionation zone to be operated in parallel with an existing first fractionation zone; feeding a portion of said effluent to said first fractionation zone; feeding another portion of said effluent to said second fractionation zone, the ratio of the volume of feed to said first fractionation zone to the volume of feed to said second fractionation zone being from 1:3 to 5:1; removing as bottoms product from said second fractionation zone a stream of hydrocarbons rich in said other inert hydrocarbon and said alkylate; removing as bottoms product from said first fractionation zone a stream containing alkylate and rich in said low-boiling inert hydrocarbon relative to said bottoms product from said second fractionation zone thereby preventing excessive buildup of said low-boiling inert hydrocarbon in said reaction zone; taking overhead from said first fractionation zone a stream comprising alkylatable hydrocarbon, acid and low-boiling inert hydrocarbon, said overhead stream from said first fractionation zone being from 5 to 20 per cent of the feed thereto; taking overhead from said second fractionation zone a stream comprising alkylatable hydrocarbon, acid and low-boiling inert hydrocarbon, said overhead stream from said second fractionation zone being from 70 to 90 per cent of the feed thereto; combining said overhead streams and passing said combined overhead stream to said reaction zone to increase the ratio of alkylatable hydrocarbon to alkylation agent therein.

7. A process according to claim 6 wherein said alkylatable hydrocarbon is an isoparaffin, said alkylating agent is an olefin and said acid is hydrofluoric acid.

8. A process according to claim 7 wherein said isoparaffin is isobutane and said olefin is contained in a mixture of hydrocarbons from refinery cracking operations comprising olefins and normal paraffins having from 3–5 carbon atoms per molecule.

9. A process according to claim 7 wherein said isoparaffin is isobutane and said olefin is contained in a mixture of hydrocarbons from refinery cracking operations comprising olefins and normal paraffins having from 3–4 carbon atoms per molecule.

10. A process according to claim 6 wherein said alkylatable hydrocarbon is a benzene, said alkylating agent is a high boiling olefin and said acid is hydrofluoric acid.

11. The process of claim 5 wherein, the amount of said hydrocarbon phase passed to said acid-stripper fractionation zone is from one to four times the volume of said hydrocarbon phase passed to said acid-iso fractionation zone, said acid is hydrofluoric acid, said low-boiling, non-reactive hydrocarbon comprises propane, and said other non-reactive hydrocarbon comprises normal butane.

References Cited in the file of this patent

UNITED STATES PATENTS

| | | |
|---|---|---|
| 2,410,498 | Hepp | Nov. 5, 1946 |
| 2,423,156 | Reid | June 1, 1947 |